US010646821B2

(12) United States Patent
Glatzmaier

(10) Patent No.: US 10,646,821 B2
(45) Date of Patent: May 12, 2020

(54) HYDROGEN SENSING AND SEPARATION

(71) Applicant: Alliance for Sustainable Energy, LLC, Golden, CO (US)

(72) Inventor: Gregory C. Glatzmaier, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 301 days.

(21) Appl. No.: 15/782,198

(22) Filed: Oct. 12, 2017

(65) Prior Publication Data

US 2018/0099246 A1 Apr. 12, 2018

Related U.S. Application Data

(60) Provisional application No. 62/506,211, filed on May 15, 2017, provisional application No. 62/433,518, (Continued)

(51) Int. Cl.
| | | |
|---|---|---|
| *B01D 53/22* | (2006.01) | |
| *H01M 8/04791* | (2016.01) | |
| *B01D 69/12* | (2006.01) | |
| *B01D 53/32* | (2006.01) | |
| *H01M 8/04089* | (2016.01) | |

(Continued)

(52) U.S. Cl.
CPC ......... *B01D 53/228* (2013.01); *B01D 53/326* (2013.01); *B01D 69/12* (2013.01); *H01M 8/04798* (2013.01); *B01D 71/022* (2013.01); *B01D 2256/16* (2013.01); *B01D 2257/102* (2013.01); *B01D 2257/7027* (2013.01); *H01M 8/04089* (2013.01); *H01M 8/04365* (2013.01); *H01M 8/04425* (2013.01); *H01M 8/0606* (2013.01); *H01M 8/0687* (2013.01)

(58) Field of Classification Search
CPC .... B01D 53/22; B01D 53/228; B01D 53/229; B01D 53/326; B01D 69/04; B01D 2256/16; H01M 8/04089; H01M 8/04798; F24S 10/40; F24S 10/45
See application file for complete search history.

(56) References Cited

U.S. PATENT DOCUMENTS

| 3,975,170 A | 8/1976 | Keating, Jr. |
| 4,886,048 A | 12/1989 | Labaton et al. |
(Continued)

OTHER PUBLICATIONS

Glatzmaier et al., "Sensor for Measuring Hydrogen Partial Pressure in Parabolic Trough Power Plant Expansion Tanks", AIP Conference Proceedings, Jun. 2017, vol. 1850, No. 1, pp. 020007-1-020007-8.

(Continued)

*Primary Examiner* — Jason M Greene
(74) *Attorney, Agent, or Firm* — Alexandra M. Hall; Robert G. Pittelkow

(57) ABSTRACT

Techniques for hydrogen sensing and mitigation are provided. As one example, a device includes a chamber and a membrane that is permeable to a first gas and is impermeable to a second gas. The membrane separates the chamber from a gas mixture that contains the first gas, such that the first gas in the gas mixture can only enter the chamber via the membrane. The device also includes a pressure sensor configured to measure a pressure within the chamber.

18 Claims, 8 Drawing Sheets

Related U.S. Application Data filed on Dec. 13, 2016, provisional application No. 62/407,125, filed on Oct. 12, 2016.

(51) Int. Cl.
*H01M 8/0606* (2016.01)
*H01M 8/0432* (2016.01)
*H01M 8/0438* (2016.01)
*H01M 8/0662* (2016.01)
*B01D 71/02* (2006.01)

(56) References Cited

U.S. PATENT DOCUMENTS

| | | | | |
|---|---|---|---|---|
| 4,892,142 A * | 1/1990 | Labaton | ............ | F24S 10/45 165/134.1 |
| 5,611,931 A * | 3/1997 | Liu | ............ | B01D 53/22 210/323.2 |
| 6,179,900 B1 * | 1/2001 | Behling | ............ | B01D 53/04 95/102 |
| 6,303,009 B1 * | 10/2001 | Bossard | ............ | C25B 1/10 204/228.4 |
| 6,554,015 B1 * | 4/2003 | Witt | ............ | B01D 53/22 137/2 |
| 6,832,608 B2 * | 12/2004 | Barkai | ............ | F24S 10/45 126/653 |
| 7,011,693 B2 | 3/2006 | Mallavarapu et al. | | |
| 8,568,582 B2 | 10/2013 | Glatzmaier | | |
| 2005/0098033 A1 * | 5/2005 | Mallavarapu | ............ | B01D 53/047 95/96 |
| 2005/0158236 A1 | 7/2005 | Rei | | |
| 2005/0188845 A1 * | 9/2005 | Yamaguchi | ............ | B01D 53/228 96/11 |
| 2005/0229488 A1 | 10/2005 | Stevens | | |
| 2010/0314093 A1 | 12/2010 | Refai-Ahmed et al. | | |
| 2012/0024715 A1 * | 2/2012 | Glatzmaier | ............ | B01D 53/22 205/337 |
| 2012/0211003 A1 * | 8/2012 | Kuckelkorn | ............ | F24S 10/45 126/653 |
| 2013/0180518 A1 * | 7/2013 | Lu | ............ | F24S 10/45 126/652 |

OTHER PUBLICATIONS

International Search Report and Written Opinion for International (PCT) Application No. PCT/US2017/056289, dated Feb. 5, 2018, pp. 1-14.

* cited by examiner

HYDROGEN SENSING AND SEPARATION

CROSS-REFERENCE TO RELATED APPLICATIONS

This application claims the benefit of U.S. Provisional Application No. 62/407,125, filed Oct. 12, 2016 and entitled "SENSOR FOR MEASURING HYDROGEN PARTIAL PRESSURE", U.S. Provisional Application No. 62/433,518, filed Dec. 13, 2016 and entitled "HYDROGEN MANAGEMENT FOR PARABOLIC TROUGH POWER PLANTS", and U.S. Provisional Application No. 62/506,211, filed May 15, 2017 and entitled "INTEGRATED HYDROGEN SENSING AND SEPARATION", the entire content of each of which is incorporated herein by reference.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

In some applications, such as in parabolic trough power plants or others, thermal energy is collected in an organic heat transfer fluid (HTF) for conversion to electricity via a generator. The HTF may be a eutectic mixture of biphenyl (BP) and diphenylether (DPE). Such an HTF has a maximum operating temperature of about 393° C. Its vapor pressure at this temperature is about 10 atmospheres. At about 393° C., thermal degradation reactions generate hydrogen gas ($H_2$).

Hydrogen gas may be undesirable. For instance, it may undesirably permeate through barriers. In addition, hydrogen gas with low partial pressure has significant thermal conductivity because of its low molecular weight and correspondingly high molecular velocity. The presence of low partial pressures of hydrogen gas in a power plant, specifically in the circulating HTF, may decrease thermal performance and corresponding electricity production.

SUMMARY

The present disclosure may provide systems, devices, and/or methods for monitoring hydrogen levels and removing hydrogen. Such techniques may be applicable to concentrating solar power plants to mitigate hydrogen released from the HTF.

In one example, a device includes a chamber and a membrane that is permeable to a first gas and is impermeable to a second gas. The membrane separates the chamber from a gas mixture that contains the first gas, such that the first gas in the gas mixture can only enter the chamber via the membrane. The device also includes a pressure sensor configured to measure a pressure within the chamber.

In another example, a device includes a cylindrical housing that has a gas mixture inlet, at a first end of the cylindrical housing, configured to receive an input of gas mixture that includes a first gas and a second gas. The cylindrical house also has a mixture chamber and a gas mixture outlet near a second end of the cylindrical housing configured to output the gas mixture. The device also includes a cylindrical membrane that has a first end and a second end, the first end being closed and the second end being open. The cylindrical membrane is disposed in the mixture chamber, coaxially to the cylindrical housing, such that the second end of the cylindrical membrane contacts the second end of the cylindrical housing, thereby forming a permeate chamber such that the first gas in the gas mixture can only enter the permeate chamber through the membrane. The cylindrical membrane is permeable to the first gas and impermeable to the second gas. The cylindrical housing further includes a permeate gas outlet at the second end of the cylindrical housing, configured to output the first gas from the permeate chamber. The device also includes a first pressure sensor configured to measure a pressure within the permeate chamber, a second pressure sensor configured to measure a pressure within the mixture chamber, a temperature sensor configured to measure a temperature of the first gas within the permeate chamber, a vacuum pump coupled to the permeate gas outlet, operable to draw the first gas in the permeate chamber out through the permeate gas outlet, and a valve operable to allow or disallow the first gas in the permeate chamber to flow out of the permeate chamber via the permeate gas outlet.

In another example, a system includes a generator configured to receive a heat transfer fluid (HTF) and convert heat energy contained in the HTF into electrical energy. The system further includes an expansion tank configured to receive, from the generator, the HTF and a flow loop that includes a plurality of heat collection units and a hydrogen monitoring unit. The flow loop is configured to receive, from the expansion tank, the HTF and output, to the generator, the HTF. Each of the heat collection units includes a first receiver tube that is configured to receive the HTF and heat the HTF using solar energy and a first annulus that substantially surrounds the first receiver tube. The first receiver tube is coated with a hydrogen barrier coating that reduces the ability of hydrogen gas to permeate from the receiver tube into the first annulus. Each of the heat collection units also includes getter material, disposed within the first annulus, that is configured to adsorb hydrogen gas in the first annulus. The hydrogen monitoring unit includes a second receiver tube that is configured to receive the HTF and heat the HTF using solar energy and a second annulus that substantially surrounds the second receiver tube. The second receiver tube is not coated with the hydrogen barrier coating and the second annulus does not contain the getter material. The hydrogen monitoring unit also includes a first temperature sensor configured to measure a temperature of the second annulus.

DETAILED DESCRIPTION

Figure 1:
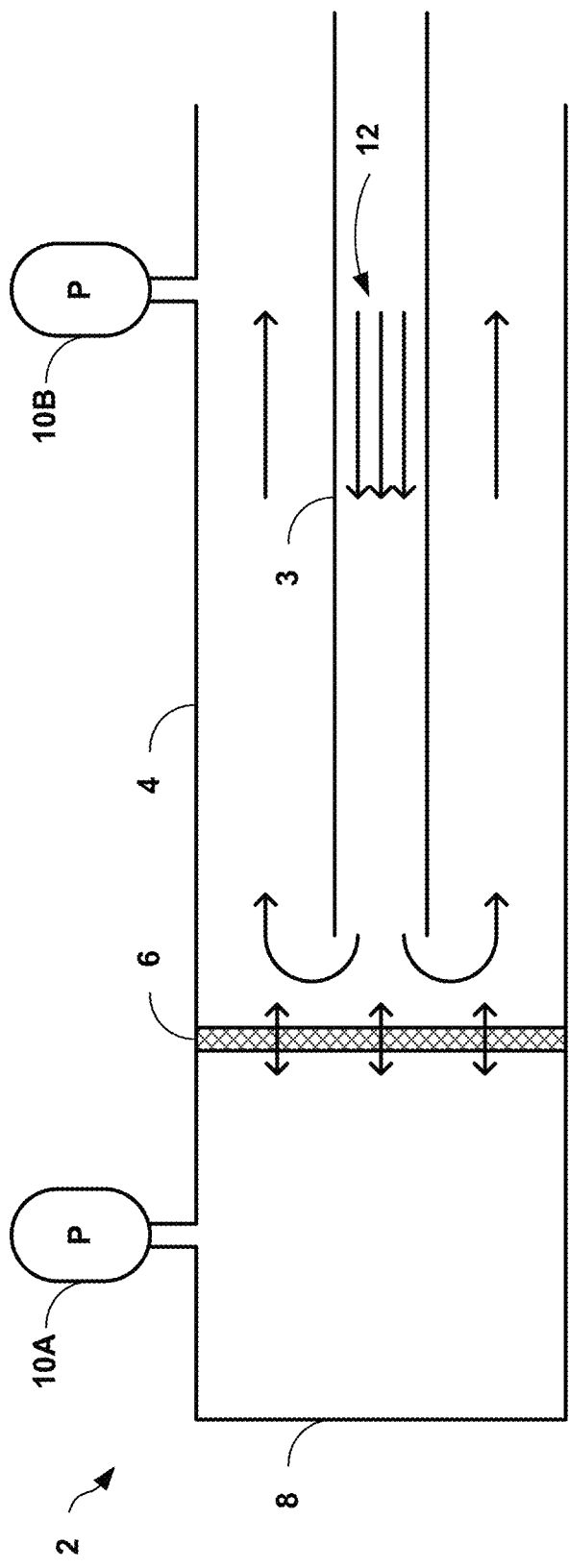
FIG. 1 is a conceptual diagram illustrating an example hydrogen sensor device, in accordance with one or more aspects of the present disclosure.

In one aspect, the present disclosure may provide systems, devices, and methods for integrated hydrogen sensing and separation. That is, the systems and devices described herein may function as both a hydrogen sensor and separator to ascertain the concentration of hydrogen in a given gas and also to remove hydrogen from the gas. Sensor and separator functions may be based on a membrane that is exclusively permeable to hydrogen. This membrane may allow hydrogen to permeate through it when there is a difference in hydrogen partial pressure from one side of the membrane to the other, and thus may be used to separate hydrogen from a gas mixture.

In another aspect, the present disclosure may provide improved systems and methods for removing hydrogen from a heat transfer fluid (HTF) or other working fluid, such as fluids used in concentrating solar power plants. As one example, the systems and methods described herein may utilize two separate flow loops—one to transfer hydrogen from the HTF within a vessel to the cover or headspace gas and one to remove that hydrogen from the gas.

In another aspect, the present disclosure may provide systems, devices, and methods for assessing hydrogen levels in the solar collector field of concentrating solar power plants. For instance, these techniques may include the use of specialized receivers that function as indicators of the internal hydrogen levels within those specialized receivers, and more generally of hydrogen levels within all receivers in the solar collector field. As another example, these techniques may include a sensor for measuring the partial pressure of hydrogen in a gas.

Any or all of these aspects may be used in conjunction to more accurately monitor and manage the levels of hydrogen in various applications, such as a concentrating solar power plant. By removing hydrogen from the HTF of a concentrating solar power plant, the techniques described herein may allow the power plant to more effectively collect heat and convert it into electricity. Furthermore, by monitoring and measuring hydrogen levels in the system, the techniques described herein may allow for more accurate measurement of plant performance and the ability to more quickly identify and address potential problems.

In some examples, the systems, devices, and methods provided herein may be described below within the context of U.S. Pat. No. 8,568,582, titled "Systems and Methods for Selective Hydrogen Transport and Measurement" and issued to Glatzmaier on Oct. 29, 2013, (hereinafter "Glatzmaier") the entire content of which is herein incorporated by reference.

In general, Glatzmaier describes systems and methods that may be used to selectively remove hydrogen from a gas mixture, such as a mixture containing hydrogen, nitrogen, methane, benzene, BP, and/or DPE. FIGS. 14-16 of Glatzmaier, for instance, illustrate various systems that may remove hydrogen from an expansion tank of a solar parabolic trough power plant. The gas mixture may be in physical contact with a liquid that contains substantially the same components and there may be mass transfer of the components between the gas and liquid mixtures.

FIG. 16 of Glatzmaier shows one example configuration for removing hydrogen from the gas and liquid contained in the power plant expansion tank. In the example of FIG. 16 of Glatzmaier, there is a first flow loop in which gas is withdrawn from the headspace volume of the tank and passed across one side of a membrane that is permeable to hydrogen. Hydrogen permeates across the membrane into a second flow loop, where it flows to the anode of a fuel cell. The fuel cell converts the hydrogen to water for release to the atmosphere. The remaining gas in the first flow loop may flow through a compressor before being re-injected into the liquid at the bottom of the expansion tank. As the injected gas bubbles up through the liquid, it may act to strip hydrogen from the liquid in the tank and transfer the hydrogen to the headspace gas, thus facilitating hydrogen removal from the tank.

FIG. 1 of the present disclosure is a conceptual diagram illustrating an example hydrogen sensor device (device 2), in accordance with one or more aspects of the present disclosure. Device 2 is configured to determine the amount of hydrogen contained in gas mixture 12. As shown in the example of FIG. 1, device 2 includes mixture inlet 3, mixture outlet 4, membrane 6, hydrogen chamber 8, and pressure sensors 10A and 10B (collectively "pressure sensors 10"). FIG. 1 is not to scale and represents only one example of a hydrogen sensor configured to determine the amount of hydrogen in a gas mixture, in accordance with the techniques described herein. Various other configurations may be used in other examples and may include more, fewer, or different components that those shown.

In the example of FIG. 1, mixture inlet 3 and mixture outlet 4 route gas mixture 12 through device 2. For example, a pump or other component (not shown) may cause gas mixture 12 to flow in to device 2 via mixture inlet 3. Gas mixture 12 may contact membrane 6 and at least a portion of gas mixture 12 may flow out of device 2 via mixture outlet 4. In the example of FIG. 1, the arrangement of mixture inlet 3 and mixture outlet 4 is coaxial, with mixture inlet 3 located inside mixture outlet 4. In other examples, other arrangements may be used. That is, any suitable arrangement that causes gas mixture 12 to flow continuously past membrane 6 and allows intimate contact of gas mixture 12 with membrane 6 may be used, in various examples. In some examples, the flow velocity of gas mixture 12 may be increased to promote hydrogen transport from the bulk of gas mixture 12 to the surface of membrane 6.

In the example of FIG. 1, membrane 6 may allow hydrogen gas to permeate or otherwise pass through it from one side to the other while substantially disallowing other gasses to permeate or pass through membrane 6. For example, one side of membrane 6 may be in constant contact with a continuous flow of gas mixture 12, which includes hydrogen as one of its components. As gas mixture 12 flows from mixture inlet 3 and across or near the surface of membrane 6, membrane 6 may allow the hydrogen contained in gas mixture 12 to enter hydrogen chamber 8. Membrane 6 may be any material that selectively allows hydrogen to permeate through it. Example materials include a palladium/silver (Pd/Ag) alloy, a palladium/copper (Pd/Cu) alloy, and others. Membrane 6 may have minimal thickness to facilitate hydrogen permeation across it. For example, membrane 6 may range from about 0.0002 inches thick to 0.01 inches thick. Membrane 6 may have located, on its low-pressure side (e.g., the side adjacent to hydrogen chamber 8), a porous metal disc or other suitable structure (not shown) that provides structural support to membrane 6 and enables it to withstand the pressure drop across it during use. Palladium alloy membranes generally operate at elevated temperature to promote hydrogen permeation and prevent hydrogen embrittlement, a condition that causes the membrane to lose its strength and rupture. The palladium/silver alloy membrane has a minimum operating temperature of 300° C. Accordingly, in some examples, sensor 2 may include one or more components (not shown) to maintain device 22 at elevated temperature.

In the example of FIG. 1, hydrogen chamber 8 contains any hydrogen that has passed through membrane 6. Prior to use, hydrogen chamber 8 may be evacuated (e.g., hydrogen chamber 8 may initially contain essentially nothing). Membrane 6 forms a boundary between gas mixture 12 and hydrogen chamber 8, which will hold a volume of hydrogen that permeates through membrane 6.

In the example of FIG. 1, pressure sensors 10A and 10B are configured to measure the pressure in hydrogen chamber 8 and the pressure in mixture outlet 4, respectively. Pressure sensors 10 may represent any suitable type of pressure sensors. Examples include sensors based on capacitance or strain measurements. Because membrane 6 is permeable exclusively to hydrogen, hydrogen gas from gas mixture 12 may permeate membrane 6, and flow into hydrogen chamber 8, establishing the same pressure as the partial pressure of hydrogen in gas mixture 12. That is, as the hydrogen partial pressure in the flow of gas mixture 12 increases or decreases, hydrogen pressure in hydrogen chamber 8 adjusts accordingly and re-establishes equilibrium with the hydrogen partial pressure of gas mixture 12. Since only hydrogen is present in hydrogen chamber 8, the total pressure in hydrogen chamber 8 is equal to the hydrogen partial pressure in gas mixture 12.

The total pressure in hydrogen chamber 8 may be measured by pressure sensor 10A. The total pressure of gas mixture 12 may be measured by pressure sensor 10B. Using these two pressure values, the hydrogen concentration by volume in gas mixture 12 may be determined as the ratio of permeate gas pressure (as measured by pressure sensor 10A) to the pressure of gas mixture 12 (as measured by pressure sensor 10B).

In some examples, device 2 may include a processor (not shown), such as a microcontroller, a field-programmable gate array (FPGA), or other suitable computing devices. The processor may be operatively coupled to pressure sensors 10 and may be configured to acquire and/or record pressure measurements, perform calculations using pressure measurements, and/or perform other operations as described herein. For example, the processor may receive pressure measurements from pressure sensors 10 and determine the hydrogen concentration by volume in gas mixture 12 based on the received pressure measurements. In some examples, the processor may be configured to output this value, such as to a plant manager, a plant control system, or other device.

Figure 2A:
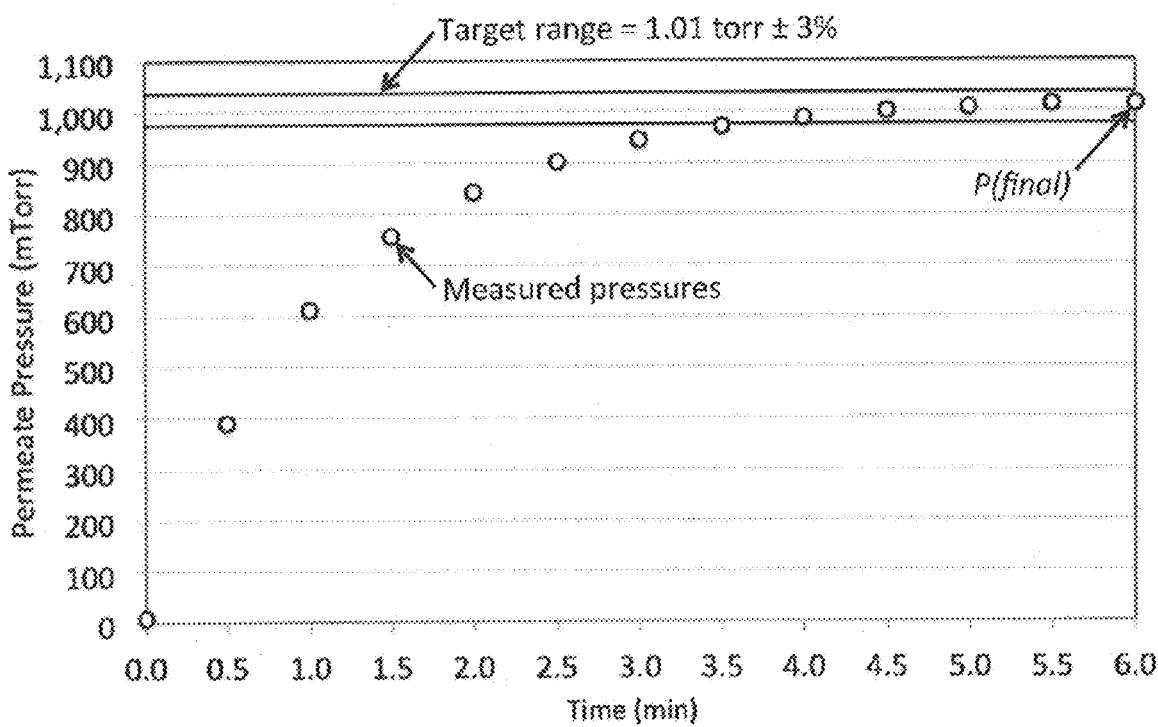
FIGS. 2A and 2B are graphical plots illustrating the performance of an example hydrogen sensor device, in accordance with one or more aspects of the present disclosure.
Figure 2B:
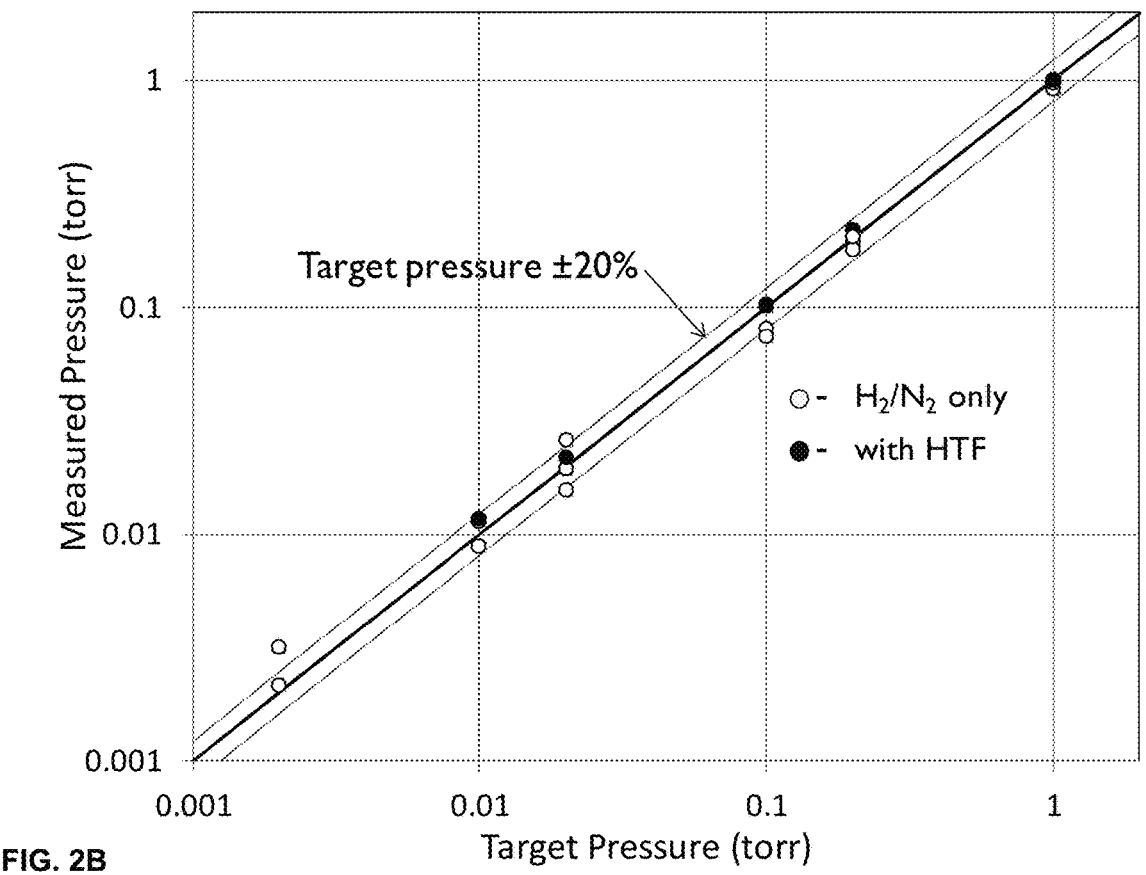

FIGS. 2A and 2B are graphical plots illustrating the performance of an example hydrogen sensor device, in accordance with one or more aspects of the present disclosure. The example device depicted in FIG. 1 was reduced to practice and hydrogen partial pressures were measured in a variety of gas mixtures, some of which contained high-boiling hydrocarbons, such as may be found in HTF. FIG. 2A shows a typical response of permeate pressure (e.g., pressure in hydrogen chamber 8) over time. For these measurements, the permeate volume (e.g., hydrogen chamber 8) was initially evacuated. At time zero, a valve was closed to isolate the permeate volume from the vacuum pump, and the pressure increased due to hydrogen permeation across membrane 8. FIG. 2A shows that the permeate pressure equilibrates with the target hydrogen gas mixture partial pressure (1.01 torr) in about five minutes, and then remains constant at P(final).

FIG. 2B summarizes similar results that were obtained using the example device depicted in FIG. 1 for measurements of hydrogen partial pressures in the range from 0.002 torr to 1 torr. Specifically, FIG. 2B shows the agreement between known hydrogen partial pressures (horizontal axis) within a gas mixture and the corresponding measured hydrogen partial pressures (vertical axis) using the hydrogen sensor device. As seen in FIG. 2B, the agreement between the known and measured values is within ±20% of the known values over the range of measurements.

Figure 3:
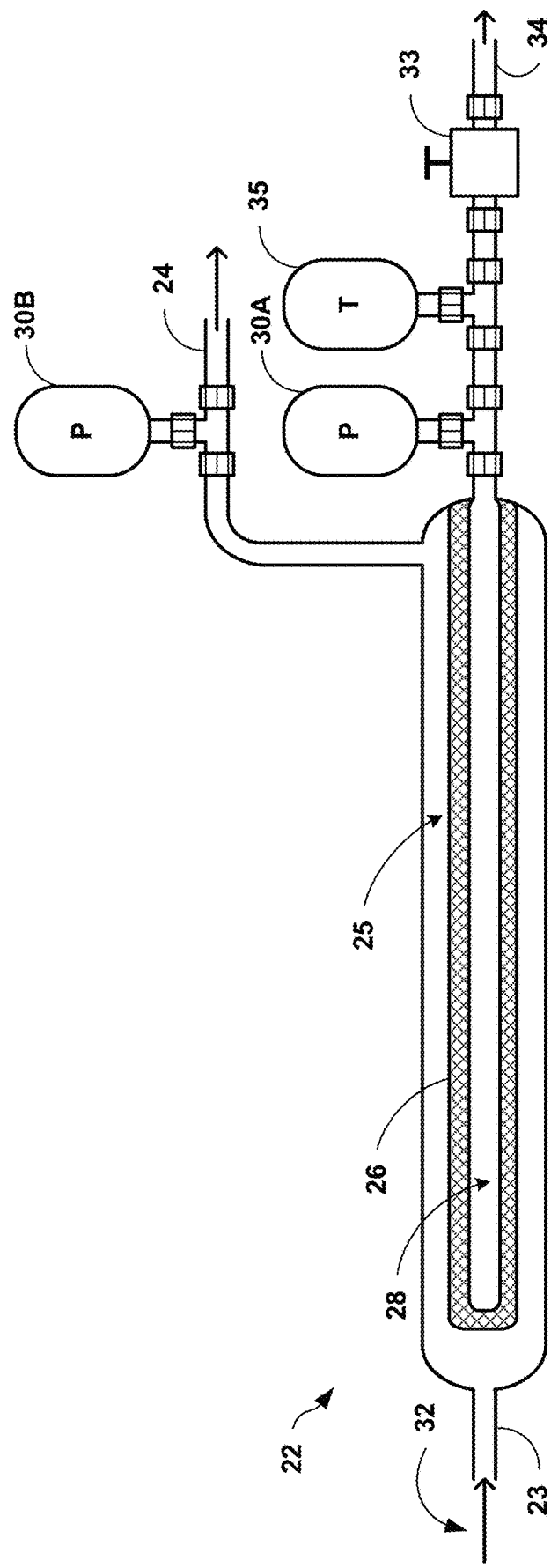
FIG. 3 is a conceptual diagram illustrating an example integrated hydrogen sensor and separation device, in accordance with one or more aspects of the present disclosure.

FIG. 3 is a conceptual diagram illustrating an example integrated hydrogen sensor and separation device (device 22), in accordance with one or more aspects of the present disclosure. Device 22 is configured to determine the amount (e.g., partial pressure or concentration) of hydrogen contained in gas mixture 32. As shown in the example of FIG. 3, device 22 includes mixture inlet 23, mixture outlet 24, mixture chamber 25, membrane 26, hydrogen chamber 28, and pressure sensors 30A and 30B (collectively "pressure sensors 30"). Device 22 also includes valve 33 and hydrogen outlet 34. FIG. 3 is not to scale and represents only one example of an integrated hydrogen sensor and separation device in accordance with the techniques described herein. Various other configurations may be used in other examples and may include more, fewer, or different components that those shown. For example, in FIG. 3 device 22 is shown having a cylindrical configuration. In other examples, integrated hydrogen sensor and separation devices configured in accordance with the techniques described herein may take various other suitable geometries.

In the example of FIG. 3, components 23, 24, 26, 28, and 30A and 30B may be substantially similar to components 3, 4, 6, 8, and 10A and 10B, respectively, as described in the context of FIG. 1. For instance, mixture inlet 23 may route gas mixture 32 into device 22. Gas mixture 32 may contact membrane 26, and at least a portion of gas mixture 32 may flow out of device 22 via mixture outlet 24. Mixture inlet 23 and mixture outlet 24 may allow for continuous flow of gas mixture 32 through mixture chamber 25 of device 22 with minimal pressure drop. Membrane 26 may allow hydrogen in gas mixture 32 to pass from mixture chamber 25, through membrane 26, and into hydrogen chamber 28. The boundary between mixture chamber 25 and hydrogen chamber 28 may be sealed, so the only transfer into hydrogen chamber 28 is hydrogen via membrane permeation.

In the example of FIG. 3, pressure sensors 30A and 30B may be configured to measure the pressure of hydrogen in hydrogen chamber 28 and the pressure of gas mixture 32 in mixture chamber 25, respectively. Temperature sensor 35 may be configured to measure the temperature, $T_p$, of hydrogen gas in hydrogen chamber 28. In some examples, device 22 may include one or more additional temperature sensors (not shown) located, for example, in or near hydrogen chamber 28 and/or in or near mixture chamber 25. In some examples, device 22 may include one or more heating devices (not shown) that are configured to maintain pressure sensors 30, temperature sensor 35, valve 33, and/or their associated tubing at a desired temperature.

In the example of FIG. 3, device 22 may have two operating modes: a separation mode and a sensing mode. In either mode, membrane 26 of device 22 may separate hydrogen from gas mixture 32. When operating in the separation mode, device 22 may operate to remove hydrogen gas from gas mixture 32. As gas mixture 32 flows through mixture chamber 25 and over membrane 26, hydrogen in gas mixture 32 may permeate through membrane 26 and into hydrogen chamber 28. Valve 33 may be open, allowing the separated hydrogen in hydrogen chamber 28 to exit device 22 via hydrogen outlet 34. The hydrogen may then be treated by one of several established methods, including thermal or catalytic oxidation, chemical reaction, oxidation at the anode of a fuel cell, and others.

In some examples, device 22 may include a vacuum pump (not shown) connected to hydrogen outlet 34. When device 22 is operating as a separator, and valve 33 is open, the vacuum pump may help to remove hydrogen from hydrogen chamber 28, thereby maintaining the pressure in hydrogen chamber 28 at low or nominally zero pressure. That is, hydrogen that enters the permeate volume (hydrogen chamber 28) may be quickly removed via the vacuum pump for treatment.

When operating in sensing mode, device 22 may function to determine the concentration of hydrogen in gas mixture 32 based on partial pressure. Valve 33 may be closed, and hydrogen gas may accumulate in hydrogen chamber 28 until the pressure in hydrogen chamber 28 equals the partial pressure of hydrogen in gas mixture 32. That is, hydrogen gas in hydrogen chamber 28 may be prohibited from exiting device 22 and thus hydrogen may start to fill hydrogen chamber 28 until the hydrogen pressure on both sides of membrane 28 equilibrates.

While operating in sensing mode, the pressure in hydrogen chamber 28 may be measured using pressure gage 30A. In some examples, the sensor function of device 22 as shown in FIG. 3 may operate the same as or similar to that of device 2 shown in FIG. 1, and its response may be of the same form as or similar to the form of the response shown in FIG. 2. In other words, when device 22 is operating in sensing mode, it may provide a determination of the hydrogen partial pressure in gas mixture 32. Hydrogen concentration by volume in the gas mixture can be determined as the ratio of permeate gas pressure to gas mixture pressure.

Figure 5:
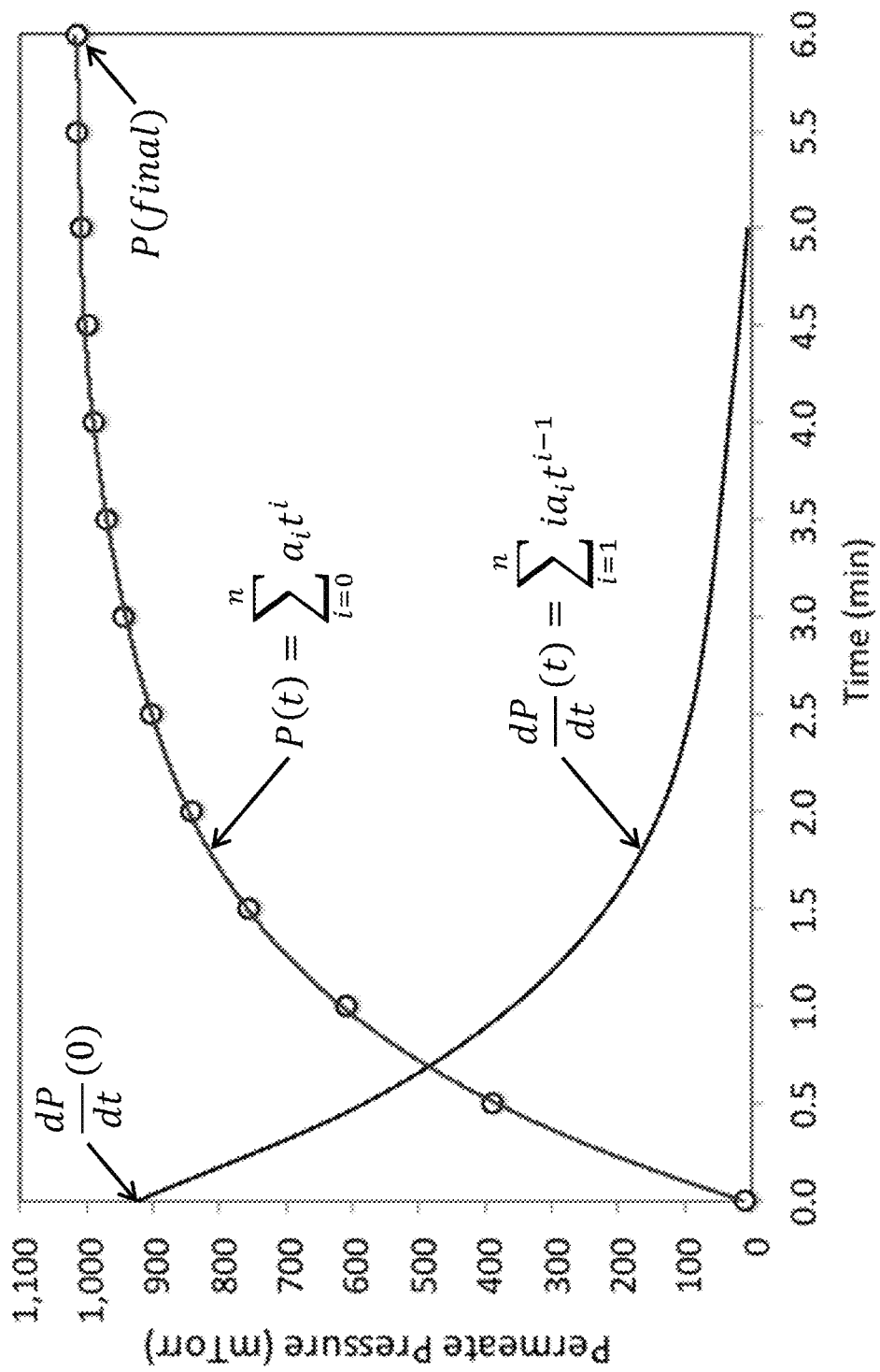
FIG. 5 is a graphical plot illustrating the operation and performance of an example integrated hydrogen sensor and separation device, in accordance with one or more aspects of the present disclosure.

In some examples, device 22 may additionally or alternatively be configured to determine the steady-state hydrogen transfer rate across membrane 28 while device 22 operates in separation mode. The steady-state hydrogen transfer rate may be useful to ensure that device 22 or other devices within the concentrating solar power plant are operating as intended. This determination may be obtained from the permeate pressure (as measured by pressure sensor 30A) versus time response shown in FIGS. 2A and 5, as detailed below.

To obtain the molar transfer rate, the pressure response can be fitted to a mathematical function of time, such as an $n^{th}$ order polynomial:

$$P(t) = \sum_{i=0}^{n} a_i t^i$$

Taking the time derivative of the pressure response gives:

$$\frac{dP}{dt}(t) = \sum_{i=1}^{n} i a_i t^{i-1}$$

The value of the derivative at t=0 may give the initial change in permeate pressure, dP/dt(0), at the time valve 33 is closed. The hydrogen molar transfer rate into hydrogen chamber 28 at t=0 relates to the change in permeate pressure by:

$$\frac{dn}{dt}(0) = \frac{V_p}{RT_p}\frac{dP}{dt}(0)$$

$V_p$ is permeate volume (e.g., the volume of hydrogen chamber 28, including gas volumes within sensors 30A and 35 and the associated tubing to valve 33), $T_p$ is permeate gas absolute temperature (e.g., the temperature of the hydrogen in hydrogen chamber 28), and R is the gas constant. Because the permeate pressure at t=0, P(0), equals the steady state permeate pressure when device 22 is operating in separation mode, the hydrogen molar transfer rate at t=0 will equal the steady-state hydrogen molar transfer rate into hydrogen chamber 28.

In some examples, device 22 may include a processor or other computing device (not shown) that is configured to interact with device 22 to control various components. For instance, the processor or other computing device may be configured to open and close valve 33, operate the vacuum pump, receive pressure measurements from pressure sensors 30, and/or receive temperature measurements from temperature sensor 35. The processor may additionally be configured to perform one or more operations to determine the concentration of hydrogen gas in gas mixture 32 and/or determine the steady-state hydrogen transfer rate across membrane 26, as detailed herein.

The pressure versus time response for device 22, as shown in the example of FIG. 3, was estimated by modeling hydrogen mass transfer within the gas mixture flow and across the membrane. The response was modeled for laboratory-scale and full-scale devices. For both cases, the model shows that the responses are much faster than the response shown in FIGS. 2A and 5. The pressure response of the lab-scale device model reaches steady state in a few seconds while the pressure response of the full-scale module reaches steady state in less than a minute. These results may be attributable to two effects: (1) the membrane area to permeate volume ratio in device 22 is greater than that of device 2 shown FIG. 1, and (2) device 22 as shown in FIG. 3 has turbulent flow through mixture chamber 25, which may enhance hydrogen transport from the bulk flow to the membrane. Regardless, if the response is too fast, the response can be lengthened by increasing the permeate volume.

Integrating the sensor with the separator simplifies the device design and allows the sensor to determine both gas mixture hydrogen partial pressure, and the hydrogen transfer rate across the membrane when the device is operating in separation mode. That is, for example, in sensing mode the device may determine (1) the hydrogen partial pressure in the gas mixture based on the final permeate pressure of the response, and (2) the steady-state hydrogen molar transfer rate across the membrane based on the time rate of change of the permeate pressure when the permeate valve is first closed. The first determination is useful to ensure that the separator module is reducing the hydrogen partial pressure in the headspace gas to the target level. The second determination is useful to ensure that the hydrogen removal rate from the expansion tank agrees with the modeled rate that reduces hydrogen in the parabolic trough power plant to acceptable levels and that the sensing and separation device is operating as expected.

Figure 4:
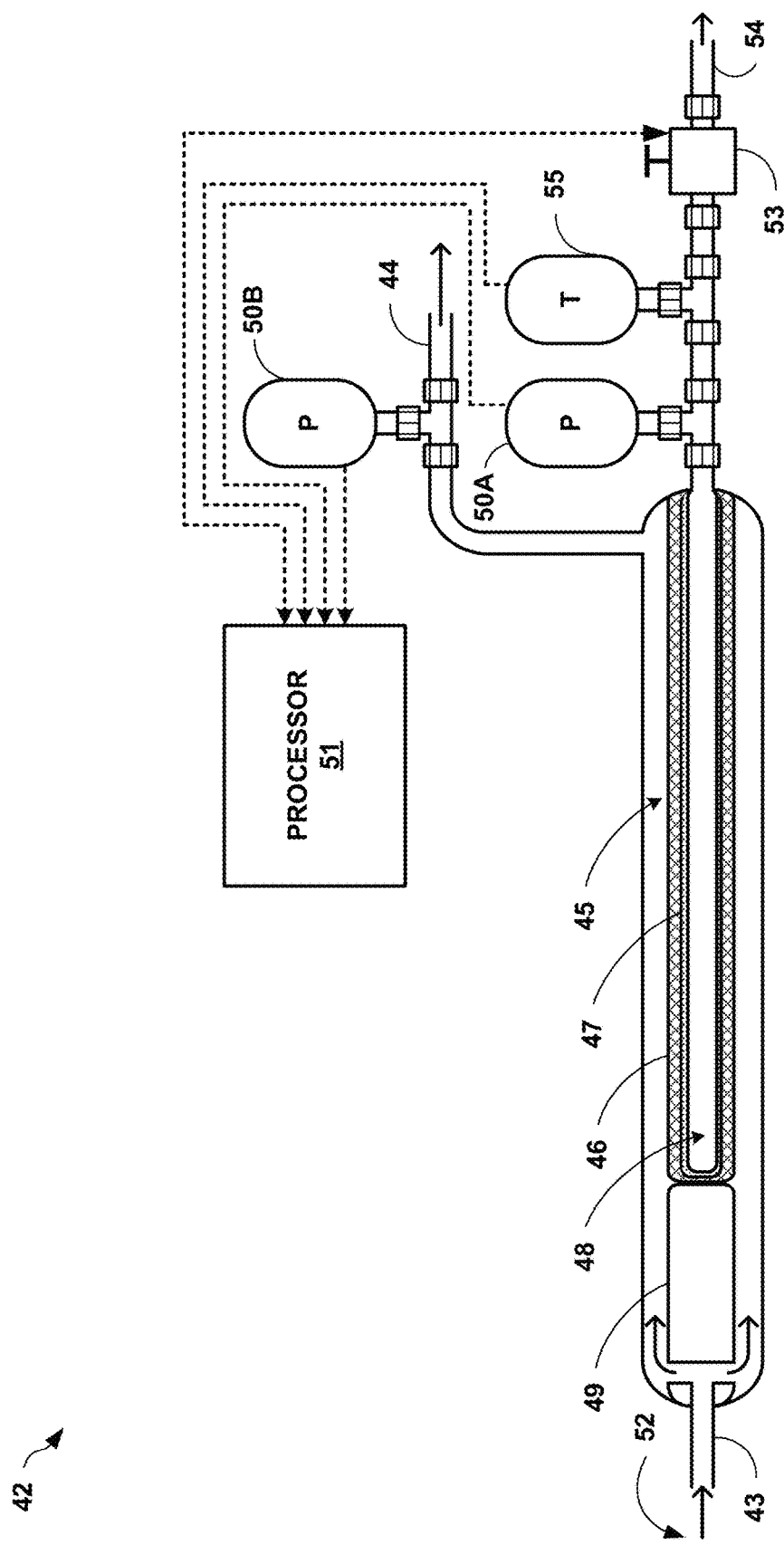
FIG. 4 is a conceptual diagram illustrating another example integrated hydrogen sensor and separation device, in accordance with one or more aspects of the present disclosure.

FIG. 4 is a conceptual diagram illustrating another example integrated hydrogen sensor and separation device (device 42), in accordance with one or more aspects of the present disclosure. As shown in the example of FIG. 4, device 42 includes mixture inlet 43, mixture outlet 44, mixture chamber 45, membrane 46, hydrogen chamber 48, pressure sensors 50A and 50B (collectively "pressure sensors 50"), valve 53, hydrogen outlet 54, and temperature sensor 55. Device 42 also includes structural support 47, flow straightener 49, and processor 51. FIG. 4 is not to scale and represents only one example of an integrated hydrogen sensor and separation device in accordance with the techniques described herein. Various other configurations may be used in other examples and may include more, fewer, or different components that those shown.

In the example of FIG. 4, components 43, 44, 45, 46, 48, 50A, 50B, 53, 54, and 55 may be substantially similar to components 23, 24, 25, 26, 28, 30A, 30B, 33, 34, and 35 respectively, as described in the context of FIG. 3. For instance, mixture inlet 43 may route gas mixture 52 into device 42, gas mixture 52 may contact membrane 46, and at least a portion of gas mixture 52 may flow out of device 42 via mixture outlet 44. Mixture inlet 43 and mixture outlet 44 may allow for continuous flow of gas mixture 52 through mixture chamber 45 of device 42 and membrane 46 may allow hydrogen in gas mixture 52 to pass from mixture chamber 45, through membrane 46, and into hydrogen chamber 48.

In the example of FIG. 4, structural support 47 may support membrane 48. As shown in the example of FIG. 4, structural support 47 is disposed on the low-pressure side of membrane 48. In other examples, structural support 47 may be disposed on the other side of membrane 48 or even within membrane 48.

Structural support 47 may be gas permeable (e.g., allowing hydrogen to permeate through membrane 48) but provide support to membrane 48 so that membrane 48 can withstand the pressure difference across the membrane during operation. As one example of structural support 47, commercially available, porous, stainless steel tubing may be used. In some examples, device 42 may include a means (not shown) to accommodate differential thermal expansion between membrane 48 and structural support 47. For example, the axial lengths of membrane 46 and structural support 47 may be designed to be slightly different at ambient temperature, so that differential expansion of the two components during heating does not generate excessive stress on either component. This effect may occur when device 42 is heated from ambient temperature up to its operating temperature.

In the example of FIG. 4, flow straightener 49 may provide a length of annular flow in which the flow stream of gas mixture 52 can establish a constant velocity flow profile with axial length. Various known means may be used to implement flow straightener 49.

In the example of FIG. 4, processor 51 is configured to operate one or more other components of device 42, to determine the amount of hydrogen in gas mixture 52 and to determine the steady-state hydrogen transfer rate across membrane 46. As shown in the example of FIG. 4, processor 51 may be operatively coupled to each of pressure sensors 50, temperature sensor 55, valve 53, and a vacuum pump (not shown) connected to hydrogen outlet 54.

In some examples, processor 51 may manage operation of device 42. For instance, while device 42 is operating in separation mode, processor 51 may be configured to cause device 42 to enter sensing mode by closing valve 53 and deactivating the vacuum pump. Processor 51 may also be configured to receive indications of pressure measurements from each of pressure sensors 50 and indications of temperature measurements from temperature sensor 55. Processor 51 may be further configured to determine, based on the received measurements, a steady-state hydrogen transfer rate across membrane 48 and/or an amount of hydrogen in gas mixture 52, as detailed herein. Processor 51 may further be configured to cause device 42 to enter separation mode by opening valve 52 and activating the vacuum pump.

In some examples, processor 51 may provide an indication of the steady-state hydrogen transfer rate and/or the amount of hydrogen to one or more other computing devices, to a user of device 42, or to another destination. In some examples, processor 51 may perform additional operations based on the determined steady-state transfer rate and/or amount of hydrogen. For instance, processor 51 may deactivate device 42 if the steady-state transfer rate deviates substantially from a specified value, which may indicate device malfunction. As another example, processor 51 may activate, deactivate, or modify operation of one or more other devices based on whether the determined amount of hydrogen is higher or lower than a threshold value, which may indicate that additional hydrogen separation is required, that hydrogen levels are acceptable, etc. In other words, processor 51 may be configured to a number of operations based on the determined values, in various examples.

The hydrogen sensing techniques and devices described with respect to FIGS. 1-5 may allow for sensing of hydrogen amounts at temperatures as high as 300° C. or more, at parts per million by volume (ppmv). Furthermore, these techniques and devices may be able to accurately quantify hydrogen in a gas mixture that does not contain oxygen. That is, in contrast to some related-art devices, the techniques and devices described herein do not need any particular atmosphere or temperature to accurately determine the amount of a particular gas in a gas mixture.

Figure 6:
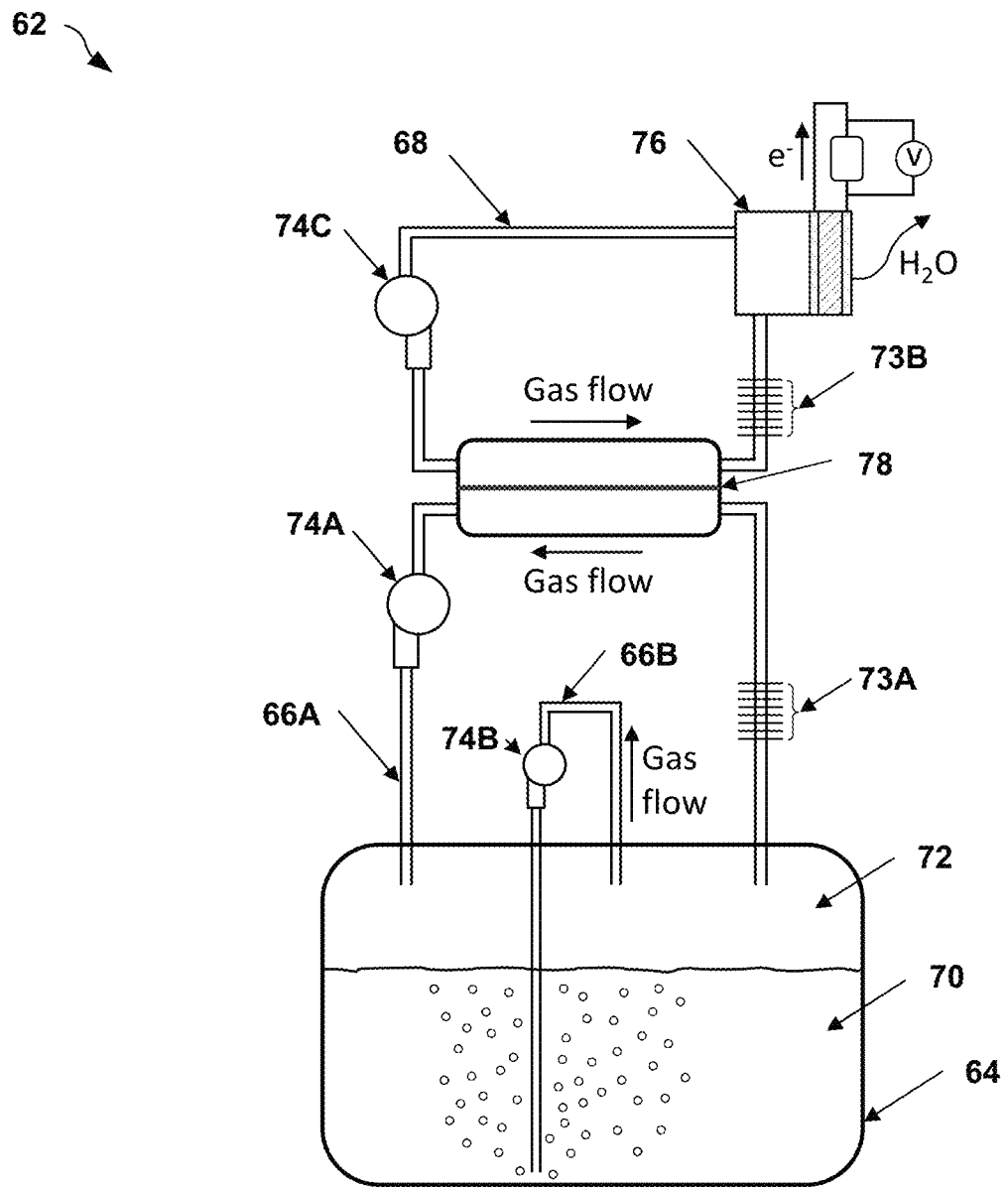
FIG. 6 is a conceptual diagram illustrating an example hydrogen purge system, in accordance with one or more aspects of the present disclosure.

FIG. 6 of the present disclosure is a conceptual diagram illustrating an example hydrogen purge system (system 62), in accordance with one or more techniques described herein. System 62 includes expansion tank 64, flow subloops 66A and 66B (collectively "subloops 46") and flow loop 68. Expansion tank 64 includes liquid 70 and headspace gas 72. Subloop 66A includes cooling/heating unit 73A and compressor 74A. Subloop 66B includes compressor 74B. Loop 68 includes cooling/heating unit 73B, compressor 74C, and fuel cell 76. Subloop 66A and loop 68 are separated by membrane 78. FIG. 6 is not to scale and represents only one example of a hydrogen purge system in accordance with the techniques described herein. Various other configurations may be used in other examples and may include more, fewer, or different components than those shown.

In the example of FIG. 6, expansion tank 64 may represent the expansion tank of a concentrating solar power plant. Liquid 70 may represent the HTF used in the power plant. Liquid 70 may be allowed to accumulate in expansion tank 64 when it is not circulating through the receivers or powering a turbine. During operation of the power plan, some of liquid 70 may evaporate or otherwise separate from liquid 70 and become a component of headspace gas 72.

In the example of FIG. 6, the first flow loop shown in FIG. 16 of Glatzmaier has been split into subloop 66A and subloop 66B. Subloop 66A withdraws headspace gas 72 from the headspace volume and, in some examples, cools or heats the gas using cooling/heating unit 73A. In some examples, cooling/heating unit 73A may not be used. Subloop 66A also passes headspace gas 72 across membrane 78. Membrane 78 represents a selectively permeable membrane. Hydrogen in headspace gas 72 may pass through membrane 78 to loop 68 to be processed. The remaining gas mixture in subloop 66A is sent through compressor 74A to be returned to expansion tank 64, and is re-injected into the headspace volume. Subloop 66B also withdraws headspace gas 72 from the headspace volume and, via compressor 74B, re-injects headspace gas 72 directly into liquid 70. As headspace gas 72 rises through liquid 70, it may strip hydrogen from liquid 70 and transfer that hydrogen to headspace gas 72.

Hydrogen that permeates through membrane 78 may optionally be cooled or heated by cooling/heating unit 73B before being processed by any number of methods. In the example of FIG. 6, for instance, the hydrogen is processed by fuel cell 76, which uses the hydrogen to produce electricity. The hydrogen is continually cycled in loop 68 by compressor 74C.

In various examples, optimal parameters for the flow of headspace gas 72 that passes across membrane 78 (e.g., via subloop 66A), and for the flow of headspace gas 72 that bubbles through liquid 70 (e.g., via subloop 66B) may be different. By splitting the first loop of FIG. 16 of Glatzmaier into two subloops, each subloop can be optimized separately and independently. For example, the gas flow in subloop 66A, that passes across membrane 78, may entail a relatively high flow rate and gas velocity to achieve the necessary reduction in hydrogen partial pressure in headspace gas 72. In subloop 66A, this high flow rate may not cause a high pressure drop because all of the flow is exclusively gas phase.

The flow of headspace gas 72 in subloop 66B, which bubbles through liquid 70, may have higher pressure drop because the gas flow must overcome the pressure of liquid 70 ($\rho gh$) at the bottom of expansion tank 64. However, the gas flow in subloop 66B may achieve adequate transfer of hydrogen from liquid 70 to headspace gas 72 at a much lower flow rate compared to the flow rate for subloop 66A. High pressure drop in a gas flow can require significant pumping power and energy consumption.

When using a single flow loop, the gas flow rate that is required for passing the gas across membrane 78 may cause excessively high pressure drop and pumping power when it is re-injected back into liquid 70 at the bottom of expansion tank 64. The separation of subloop 66A and subloop 66B, as shown in FIG. 6, allows the two gas flows to be separate. Thus they can be optimized independent from one another to achieve 1) adequate hydrogen transfer across membrane 78, 2) adequate hydrogen transfer from liquid 70 to headspace gas 72 in expansion tank 64, and 3) minimal pressure drop in subloop 66B and its associated pumping power. In some examples, there may be enough natural and forced circulation of liquid 70 in expansion tank 64 during operation to provide adequate transfer of hydrogen from liquid 70 to headspace gas 72 without intervention. Thus, in some examples, subloop 66B may be eliminated altogether.

While described with respect to FIG. 16 of Glatzmaier, the configurations and/or techniques described herein may be used in various other examples. For instance, the configurations and/or techniques described herein may be applied to modify the example of FIGS. 14 and 15 of Glatzmaier, or other suitable systems.

The techniques described herein with respect to FIGS. 3-6 provide various options for a hydrogen mitigation process that could be installed, for example, onto the HTF expansion tanks of a parabolic trough power plant. The mitigation process may allow for control and maintenance of hydrogen levels in the HTF that is circulating in the solar collector field of the power plant. In order to facilitate such control and maintenance, it may be beneficial to monitor hydrogen levels in the HTF that is circulating in the solar collector field in addition to, or as an alternative to monitoring the hydrogen levels in the HTF in the expansion tank (e.g., using the techniques described herein with respect to FIGS. 1-5. To that end, the present disclosure also provides methods and devices to monitor hydrogen levels in the HTF that is circulating in the solar collector field.

In some examples, the hydrogen measurement methods and devices described herein may be used in conjunction with the mitigation and/or monitoring systems, devices, and methods described above to ensure that the mitigation system/method is working as intended and that the mitigation system/method establishes and maintains hydrogen levels in the circulating HTF at proper levels.

Many parabolic trough power plants suffer from a long-standing problem that causes a decrease in power plant thermal performance and electricity production. The problem is caused by the buildup of hydrogen in the HTF that circulates through the solar collector field and power block subsystems. Hydrogen is generated from the thermal decomposition of the HTF, particularly when the HTF is at its highest operating temperature (e.g., at or near 393° C.). The occurrence of hydrogen in the HTF provides a driving force for hydrogen permeation from the HTF into the annulus of receivers. The occurrence of hydrogen in a receiver annulus can compromise the thermal performance of the receiver and the overall power plant.

Figure 7A:
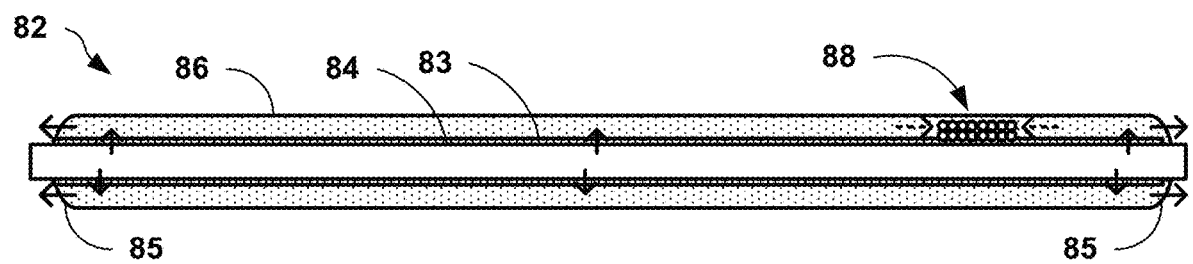
FIGS. 7A and 7B are conceptual diagrams illustrating transport modes for hydrogen within a receiver under normal operation and an example hydrogen monitoring device, in accordance with one or more aspects of the present disclosure.
Figure 7B:
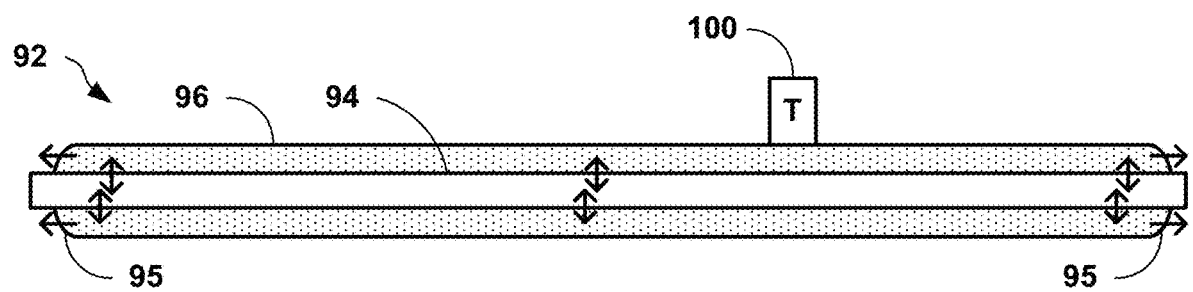

FIGS. 7A and 7B are conceptual diagrams illustrating transport modes for hydrogen within a receiver (receiver 82) under normal operation and an example hydrogen monitoring device (device 92), in accordance with one or more aspects of the present disclosure. Receiver 82 may represent a receiver in use in a concentrating solar power plant. In the example of FIG. 7A, receiver 82 includes absorber tube 84, bellows 85, annulus 86, and getter material 88. Absorber tube 84 is coated with hydrogen barrier coating 83, which may reduce the ability of hydrogen to permeate out of absorber tube 84. In the example of FIG. 7A, hydrogen barrier coating 83 is shown on the outer surface of absorber tube 84. In some examples, however, hydrogen barrier coating 83 may be applied on the inner surface of absorber tube 84 or otherwise integrated into the surface of absorber tube 84. FIGS. 7A and 8B are not to scale.

As shown in FIG. 7A by the solid arrows, during normal operation hydrogen in the HTF running through absorber tube 84 may permeate out of the absorber tube (e.g., despite the hydrogen barrier coating) across bellows 85 and/or into annulus 86. Annulus 86 contains getter material 88, which may be metal alloy pellets or another suitable material that absorbs hydrogen gas. During normal operation, hydrogen that permeates into annulus 86 may either permeate back out through the walls of bellows 85 or—as shown by the dotted arrows in FIG. 7A—may be adsorbed into getter material 88.

Getter material 88 may keep the annulus volume in annulus 86 free of hydrogen until getter material 88 saturates. Getter lifetime may vary with the temperature of the HTF that flows through the receiver but is typically about 7-20 years. Once getter material 88 saturates, hydrogen buildup in annulus 86 may become more rapid, increasing heat loss from receiver 82 and decreasing its thermal efficiency.

The hydrogen mitigation techniques described above may allow the getters of new receivers to last the full 30-year operating lifetime of a concentrating solar power plant and may regenerate getters that are already saturated, thereby restoring receiver performance. However, in either case, implementation of mitigation methods may benefit from regular assessment of hydrogen levels in the circulating HTF—particularly in the collector field—to ensure that hydrogen levels are maintained at target levels in expansion tanks and in the circulating HTF.

The level of hydrogen in the annulus of a standard receiver may be estimated by measuring the glass temperature when hot HTF is flowing through the receiver. A receiver that does not have hydrogen in its annulus volume will have a relatively low glass temperature (e.g., about 65° C.). A receiver that does have hydrogen in its annulus volume will have an elevated glass temperature (e.g., as high as 160° C.).

Remote measurement of receiver glass temperature may be performed using various techniques, including thermal imaging and infrared temperature sensors. However, measuring the glass temperature of a receiver that has getters may not give an accurate indication of the hydrogen level in the HTF that is flowing through it. This is because a receiver that has functioning, unsaturated getters may not have any significant hydrogen in its annulus volume even though the HTF flowing through its absorber tube may have very high hydrogen levels. Such conditions may be more likely during the first 7-8 years of operation of a new power plant.

Once the getters saturate, a receiver annulus may continue to have high hydrogen levels in its annulus even if the HTF is completely hydrogen free. This is a result of hydrogen desorbing back off the getters, which may keep the hydrogen level in the annulus volume high. Modeling of the dynamic response of a receiver that has saturated getters shows that, for a receiver in this condition, the time required to show decreased glass temperature after the HTF has been cleared of hydrogen is on the order of one year.

The hydrogen measurement methods described herein may use specialized hydrogen monitoring devices, such as device 92 of FIG. 7B, that are strategically installed throughout the collector field to allow for the regular monitoring of hydrogen in the collector field HTF by measuring the glass temperature of such devices. These hydrogen monitoring devices may function as custom receivers that do not substantially interfere with power plant operation, but allow for more accurate, timely determination of hydrogen levels. That is, hydrogen monitoring devices described herein may, in some examples, function similar to receivers without any getters.

In the example of FIG. 7B, device 92 includes absorber tube 94, annulus 96, and bellows 95. Device 92 also includes temperature sensor 100 which may monitor the temperature of device 92. FIG. 7B represents only one example of a hydrogen monitoring device in accordance with the techniques described herein. Various other configurations may be used in other examples and may include more, fewer, or different components that those shown. In the example of FIG. 7B, components 94, 95 and 96 may be substantially similar to components 84, 85, and 86 as described with respect to FIG. 7A with one notable exception—absorber tube 94 lacks any hydrogen barrier coating. In addition, device 92 lacks any getters in annulus 96.

The solid arrows in FIG. 7B show hydrogen transport within device 92. Hydrogen may permeate into and out of annulus 96 across the wall of absorber tube 94 and out of annulus 96 across the bellows 95. Temperature sensor 100 may be configured to measure the temperature of device 92. For example temperature sensor may be an infrared sensor or other suitable sensor capable of measuring the temperature of an outer surface (e.g., typically glass) of annulus 96. In some examples, device 92 may additionally include another temperature sensor (not shown) that is configured to measure the temperature of the HTF flowing in absorber tube 94. This temperature may be compared to the temperature measured by temperature sensor 100 to determine the relative amount of hydrogen gas present.

By avoiding the use of getters and removing any hydrogen barrier coating on absorber tube 94, the hydrogen monitoring devices described herein may be more responsive to changes in HTF hydrogen levels. Thus, when device 92 shown in FIG. 7B with HTF with high hydrogen levels flowing through absorber tube 94, hydrogen permeation across absorber tube 94 may rapidly increase the hydrogen level in annulus 96 and consequently the glass temperature of device 92 may likewise increase. Alternatively, when the HTF is hydrogen free, hydrogen that is already in annulus 96 may rapidly permeate back out across absorber tube 84 and the glass temperature of device 92 may drop accordingly.

Modeling the dynamic response of such a hydrogen monitoring device to changing levels of HTF hydrogen shows that measurable changes in glass temperature will occur within about 3-10 days after a change in HTF hydrogen level. This relatively fast response may allow power plant management software or plant personnel to monitor the state of the circulating HTF by measuring and/or monitoring the glass temperatures of these devices.

Figure 8:
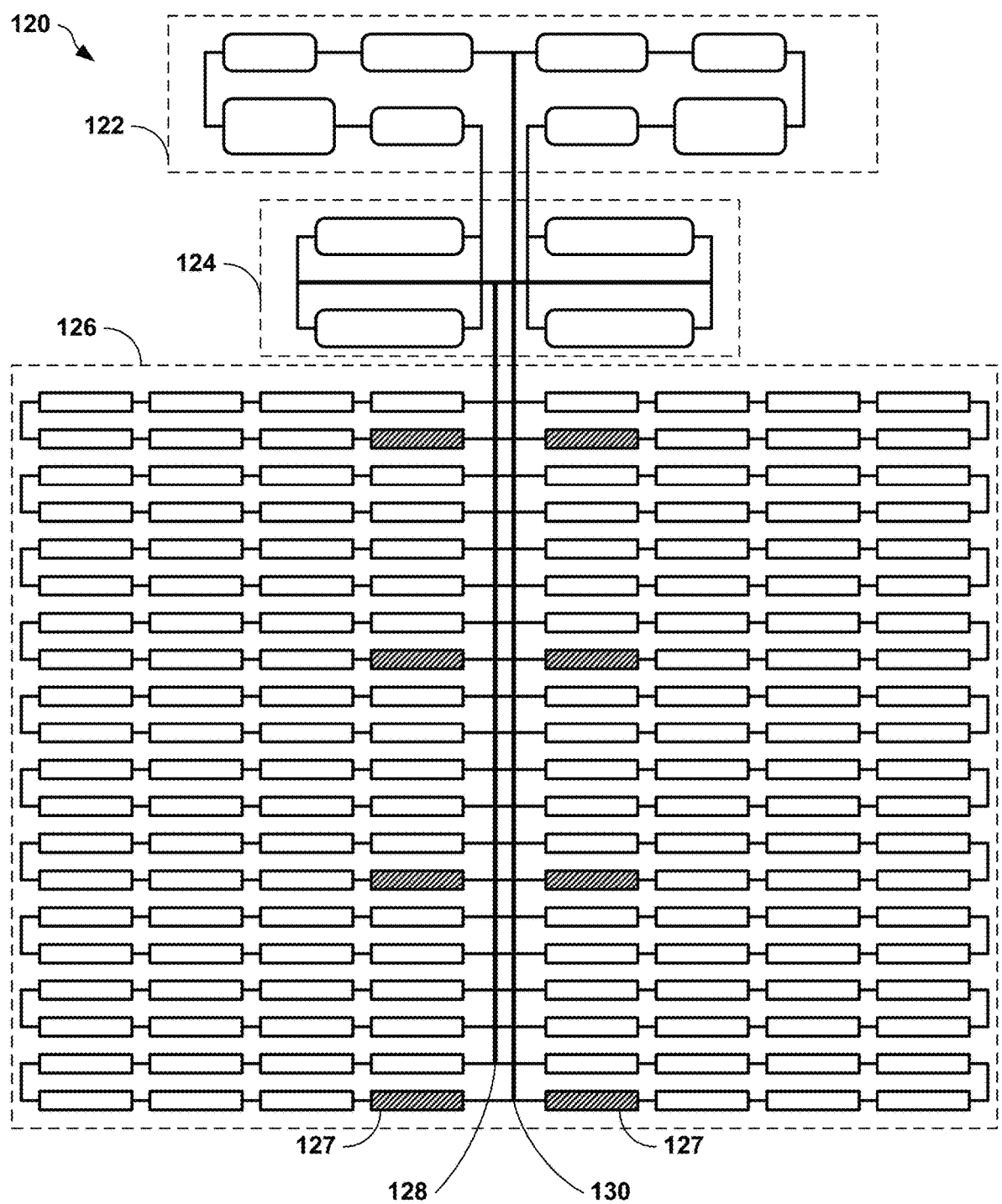
FIG. 8 is a conceptual diagram illustrating an example layout for installation of a set of hydrogen monitoring devices, in accordance with one or more aspects of the present disclosure.

FIG. 8 is a conceptual diagram illustrating an example layout for installation of a set of hydrogen monitoring devices, in accordance with one or more aspects of the present disclosure. Specifically, FIG. 8 depicts system 120, representing the power block and field layout of a typical parabolic trough plant. System 120 includes steam generators 122, expansion tanks 124, and assemblies 126. FIG. 8 is not to scale and represents only one example of a concentrating solar power plant that incorporates hydrogen monitoring devices in accordance with the techniques described herein. Various other configurations and/or organizations may be used in other examples and may include more, fewer, or different components that those shown.

Assemblies 126, in various examples, may represent any module configured to receive HTF and transfer solar heat to the HTF. In the example of FIG. 8, assemblies 126 may each represent a solar collector assembly (SCA) that includes one or more receivers and a reflecting concentrator. In other examples, assemblies 126 may represent a single receiver, multiple receivers, or one or more receivers coupled with additional or other components.

The field depicted in FIG. 8 contains 160 assemblies 126, as represented by the rectangles in FIG. 8. Assemblies 126 receive cold (or unheated) HTF from expansion tanks 124 via cold header 128 and use solar energy to heat the HTF. Receivers 126 then return the heated HTF to steam generators 122 (e.g., for electricity generation) via hot header 130. In system 120, eight of assemblies 126 combine to form a single flow loop that takes HTF from cold header 128 and heats it to high temperature before passing it to hot header 130.

System 120 also includes hydrogen monitoring assemblies 127, shown as shaded rectangles. Any number of hydrogen monitoring assemblies 127 can be located in the collector field. FIG. 8 shows example locations for eight of monitoring devices 127. In the example of FIG. 8, such assemblies are shown replacing a number of assemblies 126 in the last (e.g., the 8th) position of a flow loop, where the HTF is at its hottest temperature. Hydrogen monitoring assemblies 127 may contain at least one hydrogen monitoring device as described with respect to FIG. 7B herein. Regularly measuring the temperatures of these devices when hot HTF is flowing through them may give a reliable measure of the condition of the circulating HTF with respect to its hydrogen level. Such measurements may be provided to a plant management system and/or to plant operators for review.

In various examples, one or more aspects of the present disclosure may be used in conjunction. For example, a plant management system may include hydrogen monitoring devices, as described with respect to FIGS. 7B and 8, in the collector field, and hydrogen sensing and separation devices, as described with respect to FIGS. 3 and 4, in the expansion tanks. As another example, the hydrogen monitoring devices of FIGS. 7B and 8 may be used in conjunction with the hydrogen mitigation system of FIG. 6. As yet another example, the hydrogen mitigation system of FIG. 6 may incorporate the hydrogen sensing and separation device of FIGS. 3 & 4 (e.g., in place of membrane 78). In other words, the various aspects described herein may be used separately or in suitable conjunction with one another to properly monitor and manage hydrogen levels in a concentrating solar power plant.

While described herein as monitoring and mitigating hydrogen levels, one or more aspects of the present disclosure may also be used to monitor and mitigate levels of any number of other gaseous materials. For example, the devices of FIGS. 1, 3, and 4 may be used to measure an amount of any gas in a gas mixture and/or separate that gas from the gas mixture. This can be accomplished by selecting a different membrane that is only permeable to the desired gas.

Aspects of the present disclosure may additionally or alternatively be described by one or more of the following examples.

Example 1

A device comprising: a chamber; a membrane that is permeable to a first gas and is impermeable to a second gas, wherein the membrane separates the chamber from a gas mixture that contains the first gas, such that the first gas in the gas mixture can only enter the chamber via the membrane; and a pressure sensor configured to measure a pressure within the chamber.

Example 2

The device of example 1, further comprising: a processor that is operatively coupled to the pressure sensor, wherein the processor is configured to: receive, from the pressure sensor, a first indication that indicates the pressure within the chamber; and determine, based on the first indication and a second indication that indicates a pressure of the gas mixture, an amount of the first gas in the gas mixture.

Example 3

The device of any of examples 1-2, wherein: the pressure sensor comprises a first pressure sensor; and the device further comprises a second pressure sensor configured to measure a pressure of the gas mixture.

Example 4

The device of any of examples 1-3, further comprising: a valve coupled to the chamber, the valve being operable to allow or disallow the first gas in the chamber to flow out of the chamber via an outlet other than through the membrane.

Example 5

The device of example 4, further comprising: a processor that is operatively coupled to the valve and the pressure sensor, wherein the processor is configured to: operate the valve to disallow the first gas in the chamber to flow out of the chamber; receive, from the pressure sensor, a first indication that indicates the pressure within the chamber while the valve is disallowing the first gas in the chamber to flow out of the chamber; and determine, based on the first indication and a second indication that indicates a pressure of the gas mixture, an amount of the first gas in the gas mixture.

Example 6

The device of example 5, wherein the processor is configured to determine the amount of the first gas in the gas mixture by: dividing the pressure within the chamber by the pressure of the gas mixture to determine a molar concentration of the first gas in the gas mixture.

Example 7

The device of any of examples 1-6, further comprising: a temperature sensor configured to measure a temperature of the first gas in the chamber.

Example 8

The device of example 7, further comprising: a processor that is operatively coupled to the valve, the pressure sensor, and the temperature sensor, wherein the processor is configured to: operate the valve to disallow the first gas in the chamber to flow out of the chamber; receive, from the temperature sensor, a first indication that indicates the temperature of the first gas in the chamber; receive, from the pressure sensor, at least two second indications that each indicates a respective value of the pressure within the chamber, at different respective times, while the valve is disallowing the first gas in the chamber to flow out of the chamber; and determine, based on the first indication and the at least two second indications, an estimated transfer rate of the first gas through the membrane while the valve is allowing the gas to flow out of the chamber.

Example 9

The device of any of examples 1-8, further comprising a vacuum pump coupled to the chamber to pump the first gas in the chamber out of the chamber via an outlet other than through the membrane.

Example 10

The device of example 9, further comprising a valve coupled to the chamber and disposed between the chamber and the vacuum pump, the valve being operable to allow or disallow the first gas in the chamber to flow out of the chamber via the outlet.

Example 11

The device of any of examples 1-10, further comprising: a gas mixture inlet configured to allow a flow of the gas mixture into the device; a gas mixture outlet configured to allow the flow of the gas mixture out of the device; and a housing configured to direct the flow of the gas mixture into contact with the membrane.

Example 12

The device of any of examples 1-11, wherein: the first gas comprises hydrogen; the gas mixture comprises at least one of nitrogen, biphenyl, and diphenylether; and the membrane comprises a palladium alloy.

Example 13

A device comprising: a cylindrical housing comprising: a gas mixture inlet at a first end of the cylindrical housing configured to receive an input of gas mixture that comprises a first gas and a second gas; a mixture chamber; and a gas mixture outlet near a second end of the cylindrical housing configured to output the gas mixture; a cylindrical membrane comprising a first end and a second end, the first end being closed and the second end being open, wherein: the cylindrical membrane is disposed in the mixture chamber, coaxially to the cylindrical housing, such that the second end of the cylindrical membrane contacts the second end of the cylindrical housing, thereby forming a permeate chamber such that the first gas in the gas mixture can only enter the permeate chamber through the membrane, the cylindrical membrane is permeable to the first gas and impermeable to the second gas, wherein the cylindrical housing further comprises a permeate gas outlet at the second end of the cylindrical housing, configured to output the first gas from the permeate chamber; a first pressure sensor configured to measure a pressure within the permeate chamber; a second pressure sensor configured to measure a pressure within the mixture chamber; a temperature sensor configured to measure a temperature of the first gas within the permeate chamber; a vacuum pump coupled to the permeate gas outlet, operable to draw the first gas in the permeate chamber out through the permeate gas outlet; and a valve operable to allow or disallow the first gas in the permeate chamber to flow out of the permeate chamber via the permeate gas outlet.

Example 14

The device of example 13, further comprising a processor operatively coupled to the first pressure sensor, the second pressure sensor, the temperature sensor, and the valve, wherein the processor is configured to: while the valve is allowing the first gas in the permeate chamber to flow out of the permeate chamber: operate the valve to disallow the first gas in the permeate chamber to flow out of the chamber; and disengage the vacuum pump; while the valve is disallowing the first gas in the permeate chamber to flow out of the permeate chamber: receive, from the temperature sensor, a first indication that indicates the temperature of the first gas in the permeate chamber; receive, from the first pressure sensor, a plurality of second indications that each indicates a respective value of the pressure within the permeate chamber at a respective time; receive, from the second pressure sensor, a third indication that indicates the pressure within the mixture chamber; determine, based on at least two of the plurality of second indications, whether the pressure within the permeate chamber has substantially equilibrated; and responsive to determining that the pressure within the permeate chamber has substantially equilibrated: operate the valve to allow the first gas in the permeate chamber to flow out of the chamber; and engage the vacuum pump; determine, based on particular second indication in the plurality of second indications and the third indication, an amount of the first gas in the gas mixture; and determine, based on the first indication and at least two of the plurality of second indications, an estimated transfer rate of the first gas through the cylindrical membrane.

Example 15

The device of any of examples 13-15, wherein: the first gas comprises hydrogen; the gas mixture comprises at least one of nitrogen, biphenyl, and diphenylether; and the membrane comprises a palladium alloy.

Example 16

A system comprising: a generator configured to: receive a heat transfer fluid (HTF); and convert heat energy contained in the HTF into electrical energy; an expansion tank configured to receive, from the generator, the HTF; a flow loop comprising a plurality of heat collection units and a hydrogen monitoring unit, the flow loop being configured to: receive, from the expansion tank, the HTF; and output, to the generator, the HTF, wherein each of the plurality of heat collection units comprises: a first receiver tube that is configured to receive the HTF and heat the HTF using solar energy; a first annulus that substantially surrounds the first receiver tube, wherein the first receiver tube is coated with a hydrogen barrier coating that reduces the ability of hydrogen gas to permeate from the receiver tube into the first annulus; and getter material, disposed within the first annulus, configured to adsorb hydrogen gas in the first annulus, and wherein the hydrogen monitoring unit comprises: a second receiver tube that is configured to receive the HTF and heat the HTF using solar energy; a second annulus that substantially surrounds the second receiver tube, wherein the second receiver tube is not coated with the hydrogen barrier coating and wherein the second annulus does not contain the getter material; and a first temperature sensor configured to measure a temperature of the second annulus.

Example 17

The system of example 16, wherein: the flow loop comprises a monitoring flow loop, the plurality of heat collection units comprises a first plurality of heat collection units; the system further comprises a plurality of non-monitoring flow loops, each non-monitoring flow loop comprises a respective plurality of heat collection units, and each non-monitoring flow loop does not include the hydrogen monitoring unit.

Example 18

The system of any of examples 16-17, wherein the hydrogen monitoring unit further comprises a second temperature sensor configured to measure a temperature of the HTF within the second receiver tube.

Example 19

The system of any of examples 16-18, wherein the hydrogen monitoring unit is disposed in the flow loop after the plurality of heat collection units.

Example 20

The system of any of examples 16-19, wherein hydrogen monitoring unit comprises a plurality of second receiver tubes and a plurality of respective second annuluses.

In one or more examples, at least some of the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented using a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
    a chamber;
    a membrane that is permeable to a first gas and is impermeable to a second gas, wherein the membrane separates the chamber from a gas mixture that contains the first gas, such that the first gas in the gas mixture can only enter the chamber via the membrane;
    a pressure sensor configured to measure a pressure within the chamber;
    a vacuum pump coupled to the chamber to pump the first gas in the chamber out of the chamber via an outlet other than through the membrane; and
    a valve coupled to the chamber and disposed between the chamber and the vacuum pump, the valve being operable to allow or disallow the first gas in the chamber to flow out of the chamber via the outlet.

2. The device of claim 1, further comprising:
    a processor that is operatively coupled to the pressure sensor, wherein the processor is configured to:
        receive, from the pressure sensor, a first indication that indicates the pressure within the chamber; and
        determine, based on the first indication and a second indication that indicates a pressure of the gas mixture, an amount of the first gas in the gas mixture.

3. The device of claim 1, wherein:
    the pressure sensor comprises a first pressure sensor; and
    the device further comprises a second pressure sensor configured to measure a pressure of the gas mixture.

4. The device of claim 1, further comprising:
    a valve coupled to the chamber, the valve being operable to allow or disallow the first gas in the chamber to flow out of the chamber via an outlet other than through the membrane.

5. The device of claim 4, further comprising:
    a processor that is operatively coupled to the valve and the pressure sensor, wherein the processor is configured to:
        operate the valve to disallow the first gas in the chamber to flow out of the chamber;
        receive, from the pressure sensor, a first indication that indicates the pressure within the chamber while the valve is disallowing the first gas in the chamber to flow out of the chamber; and determine, based on the first indication and a second indication that indicates a pressure of the gas mixture, an amount of the first gas in the gas mixture.

6. The device of claim 5, wherein the processor is configured to determine the amount of the first gas in the gas mixture by:
dividing the pressure within the chamber by the pressure of the gas mixture to determine a molar concentration of the first gas in the gas mixture.

7. The device of claim 1, further comprising:
a temperature sensor configured to measure a temperature of the first gas in the chamber.

8. The device of claim 7, further comprising:
a processor that is operatively coupled to the valve, the pressure sensor, and the temperature sensor, wherein the processor is configured to:
operate the valve to disallow the first gas in the chamber to flow out of the chamber;
receive, from the temperature sensor, a first indication that indicates the temperature of the first gas in the chamber;
receive, from the pressure sensor, at least two second indications that each indicates a respective valve of the pressure within the chamber, at different respective times, while the valve is disallowing the first gas in the chamber to flow out of the chamber; and
determine, based on the first indication and the at least two second indications, an estimated transfer rate of the first gas through the membrane while the valve is allowing the gas to flow out of the chamber.

9. The device of claim 1, further comprising:
a gas mixture inlet configured to allow a flow of the gas mixture into the device;
a gas mixture outlet configured to allow the flow of the gas mixture out of the device; and
a housing configured to direct the flow of the gas mixture into contact with the membrane.

10. The device of claim 1, wherein:
the first gas comprises hydrogen;
the gas mixture comprises at least one of nitrogen, biphenyl, and diphenylether; and
the membrane comprises a palladium alloy.

11. A device comprising:
a cylindrical housing comprising:
a gas mixture inlet at a first end of the cylindrical housing configured to receive an input of gas mixture that comprises a first gas and a second gas;
a mixture chamber; and
a gas mixture outlet near a second end of the cylindrical housing configured to output the gas mixture;
a cylindrical membrane comprising a first end and a second end, the first end being closed and the second end being open, wherein:
the cylindrical membrane is disposed in the mixture chamber, coaxially to the cylindrical housing, such that the second end of the cylindrical membrane contacts the second end of the cylindrical housing, thereby forming a permeate chamber such that the first gas in the gas mixture can only enter the permeate chamber through the membrane, and
the cylindrical membrane is permeable to the first gas and impermeable to the second gas,
wherein the cylindrical housing further comprises a permeate gas outlet at the second end of the cylindrical housing, configured to output the first gas from the permeate chamber;

a first pressure sensor configured to measure a pressure within the permeate chamber;
a second pressure sensor configured to measure a pressure within the mixture chamber;
a temperature sensor configured to measure a temperature of the first gas within the permeate chamber;
a vacuum pump coupled to the permeate gas outlet, operable to draw the first gas in the permeate chamber out through the permeate gas outlet; and
a valve operable to allow or disallow the first gas in the permeate chamber to flow out of the permeate chamber via the permeate gas outlet.

12. The device of claim 11, further comprising a processor operatively coupled to the first pressure sensor, the second pressure sensor, the temperature sensor, and the valve, wherein the processor is configured to:
while the valve is allowing the first gas in the permeate chamber to flow out of the permeate chamber:
operate the valve to disallow the first gas in the permeate chamber to flow out of the chamber; and
disengage the vacuum pump;
while the valve is disallowing the first gas in the permeate chamber to flow out of the permeate chamber:
receive, from the temperature sensor, a first indication that indicates the temperature of the first gas in the permeate chamber;
receive, from the first pressure sensor, a plurality of second indications that each indicates a respective value of the pressure within the permeate chamber at a respective time;
receive, from the second pressure sensor, a third indication that indicates the pressure within the mixture chamber;
determine, based on at least two of the plurality of second indications, whether the pressure within the permeate chamber has substantially equilibrated; and
responsive to determining that the pressure within the permeate chamber has substantially equilibrated:
operate the valve to allow the first gas in the permeate chamber to flow out of the chamber; and
engage the vacuum pump;
determine, based on particular second indication in the plurality of second indications and the third indication, an amount of the first gas in the gas mixture; and
determine, based on the first indication and at least two of the plurality of second indications, an estimated transfer rate of the first gas through the cylindrical membrane.

13. The device of claim 11, wherein:
the first gas comprises hydrogen;
the gas mixture comprises at least one of nitrogen, biphenyl, and diphenylether; and
the membrane comprises a palladium alloy.

14. A system comprising:
a generator configured to:
receive a heat transfer fluid (HTF); and
convert heat energy contained in the HTF into electrical energy;
an expansion tank configured to receive, from the generator, the HTF;
a flow loop comprising a plurality of heat collection units and a hydrogen monitoring unit, the flow loop being configured to:
receive, from the expansion tank, the HTF; and
output, to the generator, the HTF,
wherein each of the plurality of heat collection units comprises:

a first receiver tube that is configured to receive the HTF and heat the HTF using solar energy;

a first annulus that substantially surrounds the first receiver tube, wherein the first receiver tube is coated with a hydrogen barrier coating that reduces the ability of hydrogen gas to permeate from the receiver tube into the first annulus; and getter material, disposed within the first annulus, configured to absorb hydrogen gas in the first annulus, and wherein the hydrogen monitoring unit comprises:

a second receiver tube that is configured to receive the HTF and heat the HTF using solar energy;

a second annulus that substantially surrounds the second receiver tube, wherein the second receiver tube is not coated with the hydrogen barrier coating and wherein the second annulus does not contain the getter material; and a first temperature sensor configured to measure a temperature of the second annulus.

15. The system of claim 14, wherein:

the flow loop comprises a monitoring flow loop, the plurality of heat collection units comprises a first plurality of heat collection units;

the system further comprises a plurality of non-monitoring flow loops, each non-monitoring flow loop comprises a respective plurality of heat collection units, and each non-monitoring flow loop does not include the hydrogen monitoring unit.

16. The system of claim 14, wherein the hydrogen monitoring unit further comprises a second temperature sensor configured to measure a temperature of the HTF within the second receiver tube.

17. The system of claim 14, wherein the hydrogen monitoring unit is disposed in the flow loop after the plurality of heat collection units.

18. The system of claim 14, wherein hydrogen monitoring unit comprises a plurality of second receiver tubes and a plurality of respective second annuluses.

* * * * *